US009659227B2

United States Patent
Nakashima et al.

(10) Patent No.: US 9,659,227 B2
(45) Date of Patent: May 23, 2017

(54) DETECTING OBJECT FROM IMAGE DATA USING FEATURE QUANTITIES

(71) Applicant: CANON KABUSHIKI KAISHA, Tokyo (JP)

(72) Inventors: Daisuke Nakashima, Kawasaki (JP); Tsewei Chen, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/664,065

(22) Filed: Mar. 20, 2015

(65) Prior Publication Data

US 2015/0279039 A1 Oct. 1, 2015

(30) Foreign Application Priority Data

Mar. 28, 2014 (JP) .................................. 2014-069687

(51) Int. Cl.
G06K 9/00 (2006.01)
G06K 9/46 (2006.01)
G06K 9/62 (2006.01)

(52) U.S. Cl.
CPC ......... *G06K 9/4642* (2013.01); *G06K 9/6257* (2013.01); *G06K 9/00228* (2013.01); *G06K 2009/4666* (2013.01)

(58) Field of Classification Search
None
See application file for complete search history.

(56) References Cited

U.S. PATENT DOCUMENTS

| 7,630,525 B2 | 12/2009 | Sabe et al. |
| 7,689,034 B2 | 3/2010 | Terakawa |
| 7,844,108 B2 | 11/2010 | Sabe et al. |
| 8,611,645 B2 | 12/2013 | Sumiyoshi et al. |
| 2009/0220156 A1* | 9/2009 | Ito .................... G06K 9/00248 382/201 |

(Continued)

FOREIGN PATENT DOCUMENTS

| JP | 2009-032022 A | 2/2009 |
| JP | 4238537 B2 | 3/2009 |

(Continued)

OTHER PUBLICATIONS

T. Ojala et al., "Multiresolution Gray-Scale and Rotation Invariant Texture Classification with Local Binary Patterns", IEEE Trans. on PAMI, vol. 24, No. 7, pp. 971-987 (2002).

(Continued)

*Primary Examiner* — Hadi Akhavannik
(74) *Attorney, Agent, or Firm* — Fitzpatrick, Cella, Harper & Scinto

(57) ABSTRACT

Object detecting apparatus and method enable to easily and accurately generate a feature quantity for detecting an object at low cost. To achieve this, in the object detecting apparatus and method, a value is assigned in consideration of relations of rotation and reversal in uniform patterns by using a small-sized conversion table, and, an ULBP feature quantity after rotation and reversal is generated from a previous ULBP feature quantity by simple calculation without using a conversion table indicating a correspondence relation between previous values and values after rotation and reversal.

17 Claims, 13 Drawing Sheets

(56) References Cited

U.S. PATENT DOCUMENTS

| | | | | |
|---|---|---|---|---|
| 2010/0329556 A1* | 12/2010 | Mitarai | ................ | G06K 9/6251 |
| | | | | 382/170 |
| 2012/0243742 A1* | 9/2012 | Sato | ................... | G06K 9/00288 |
| | | | | 382/103 |
| 2014/0056509 A1 | 2/2014 | Nakashima et al. | | |

FOREIGN PATENT DOCUMENTS

| | | |
|---|---|---|
| JP | 4556891 B2 | 10/2010 |
| JP | 4628882 B2 | 2/2011 |
| JP | 5025893 B2 | 9/2012 |
| JP | 2012-203691 A | 10/2012 |
| WO | 2009/078155 A1 | 6/2009 |

OTHER PUBLICATIONS

P. Viola et al., "Rapid Object Detection Using a Boosted Cascade of Simple Features", CVPR2001, vol. 1, pp. 511-518 (2001).
Q. Tao et al., "Illumination Normalization Based on Simplified Local Binary Patterns for a Face Verification System", Biometrics Symposium, pp. 1-6 (2007).

\* cited by examiner

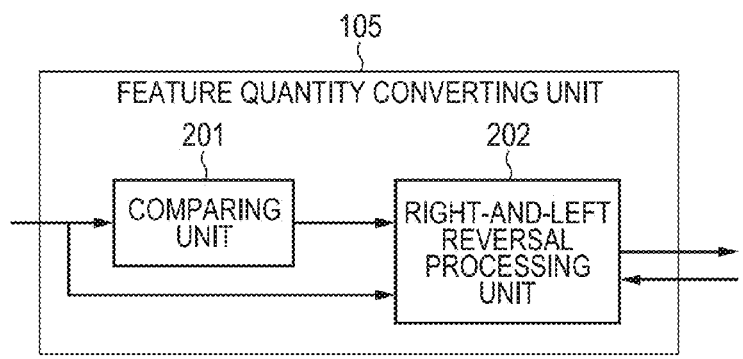
FIG. 2
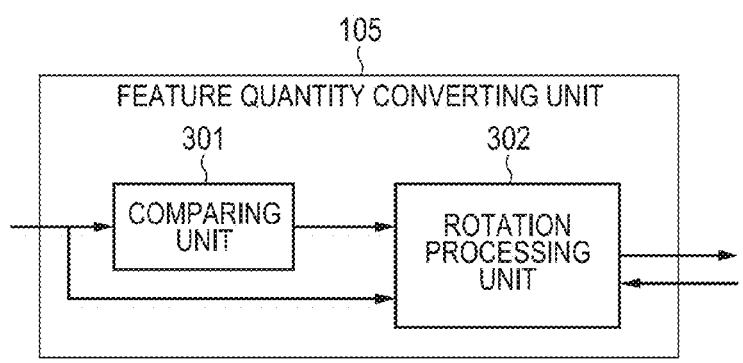
FIG. 3
FIG. 4
| d0 | d1 | d2 |
| --- | --- | --- |
| d7 |    | d3 |
| d6 | d5 | d4 |

FIG. 7

| i | COORDINATES | | EVALUATION VALUES FOR FEATURE QUANTITY VALUES | | | | | THRESHOLDS (Th) |
|---|---|---|---|---|---|---|---|---|
| | x | y | 0 | 1 | 2 | ... | 57 | |
| 0 | 21 | 35 | 26 | 32 | 30 | ... | 1 | 3 |
| 1 | 5 | 52 | 4 | 7 | 5 | ... | 62 | 30 |
| 2 | 46 | 12 | 20 | 35 | 41 | ... | 12 | 41 |
| ⋮ | ⋮ | ⋮ | ⋮ | ⋮ | ⋮ | ⋮ | ⋮ | ⋮ |
| N-1 | 15 | 20 | 2 | 6 | 10 | ... | 30 | 2534 |

FIG. 8

1ST LINE
- ULBP (1, 1)
- ULBP (2, 1)
- ⋮
- ULBP (W-2, 1)

2ND LINE
- ULBP (1, 2)
- ULBP (2, 2)
- ⋮
- ULBP (W-2, 2)

⋮

(H-2)TH LINE
- ULBP (1, H-2)
- ULBP (2, H-2)
- ⋮
- ULBP (W-2, H-2)

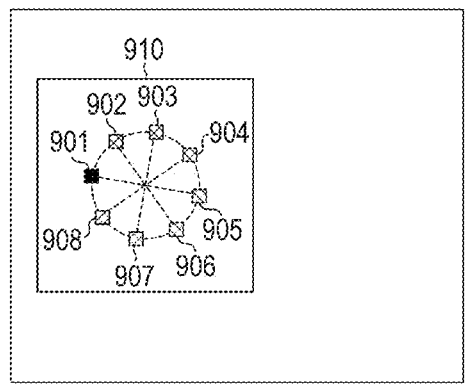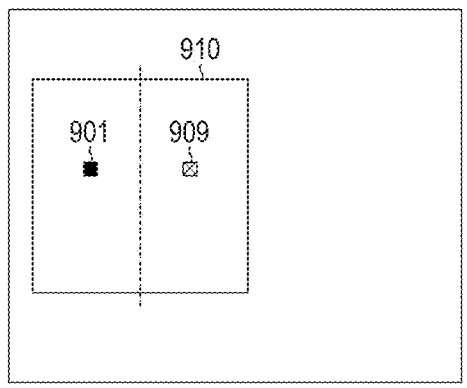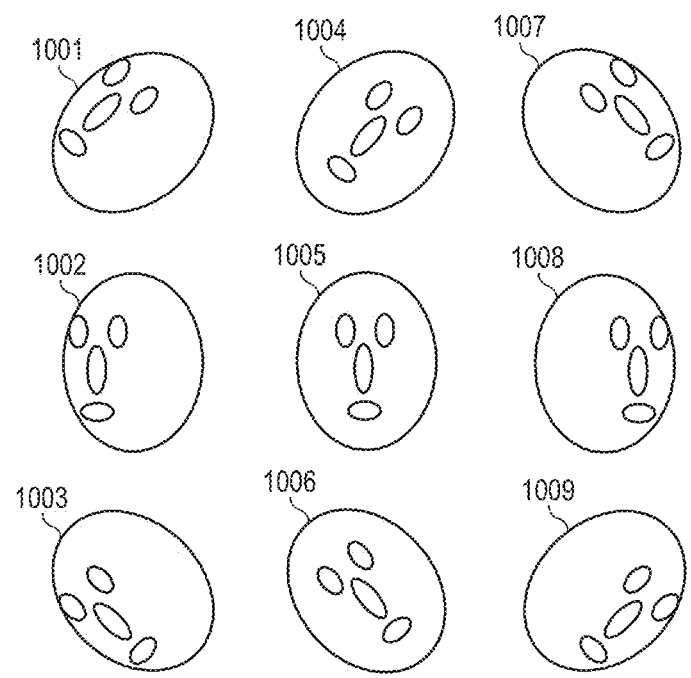

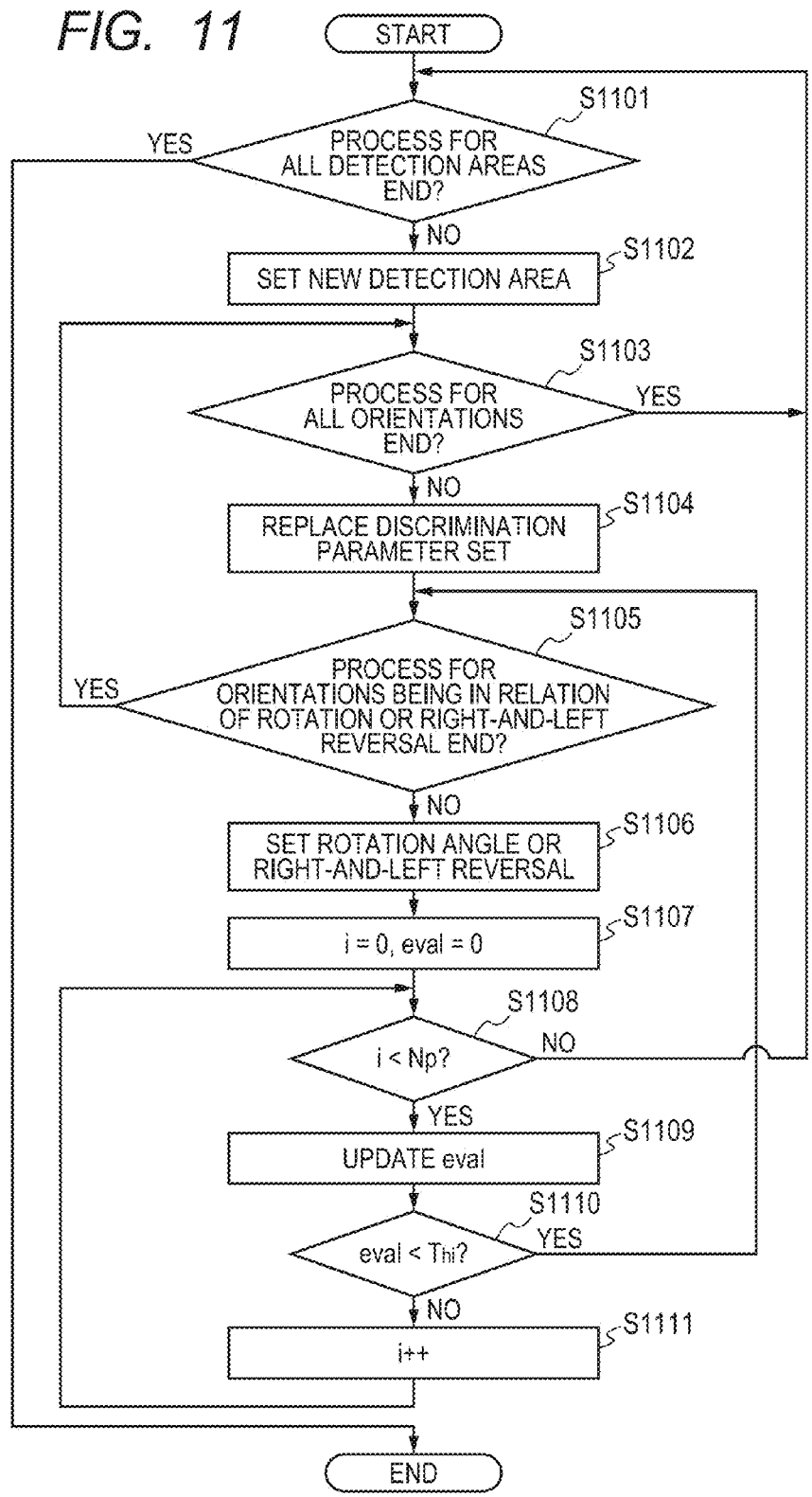

FIG. 17
| i | AREA INFORMATION | | | | COEFFICIENTS BY WHICH BIN IS TO BE MULTIPLIED | | | | | THRESHOLDS (Th) |
|---|---|---|---|---|---|---|---|---|---|---|
| | x | y | WIDTH | HEIGHT | 0 | 1 | 2 | ... | 57 | |
| 0 | 9 | 4 | 10 | 15 | -2 | 3 | 5 | ... | 1 | 20 |
| 1 | 32 | 40 | 20 | 10 | 3 | 0 | 10 | ... | -2 | 24 |
| 2 | 6 | 19 | 15 | 15 | 0 | 4 | 8 | ... | 5 | 50 |
| : | : | : | : | : | : | : | : | : | : | : |
| N-1 | 10 | 21 | 15 | 15 | 4 | 5 | 0 | ... | -3 | 71 |
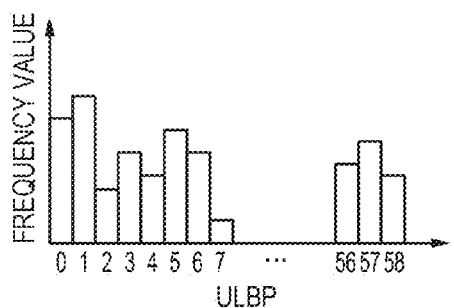
FIG. 18A
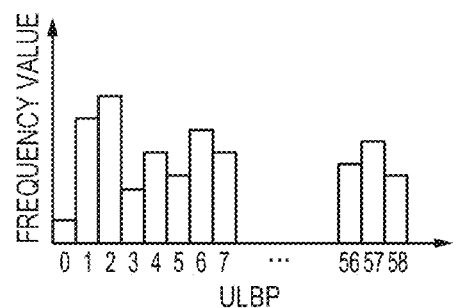
FIG. 18B

DETECTING OBJECT FROM IMAGE DATA USING FEATURE QUANTITIES

BACKGROUND OF THE INVENTION

Field of the Invention

The present invention relates to object detecting apparatus and method which are particularly suitable for detecting objects of various orientations.

Description of the Related Art

Conventionally, a technique of detecting a physical object such as a face, a human body or the like included in an image has been proposed. In this technique, the physical object included in the image is detected generally by the following process. That is, an area for which it is decided whether or not the physical object exists is first set, and a predetermined feature quantity is extracted from the set area. Then, a discriminator previously created by machine learning decides, by referring to the extracted feature quantity, whether or not the physical object exists in the set area.

Incidentally, there are physical objects of various orientations in the image, and feature quantity patterns change according to the orientations even for the same physical object. Therefore, it is difficult, by using the same discriminator, to detect the physical objects of all the orientations with high degree of accuracy. Under the circumstances, Japanese Patent No. 5025893 proposes the method of providing a plurality of discriminators each specialized to detect a specific-orientation physical object. In this method, since the orientation to be detected by the one discriminator is limited, it is possible to detect the physical objects of various orientations with high degree of accuracy as compared with the case in which the same discriminator is used for all the orientations.

FIG. 12 is a diagram illustrating a processing flow by a boosting discriminator generally used when detecting physical objects (see P. Viola, and M. Jones, "Rapid Object Detection Using a Boosted Cascade of Simple Features", CVPR2001, Vol. 1, pp. 511-518). Here, discriminating processes 1201 to 120N respectively correspond to first to N-th discriminating processes which are performed in order of 1 to N. In each of the discriminating processes, it is decided whether a physical object exists (TRUE) or does not exist (FALSE) by referring to a feature quantity according to a discrimination parameter previously created by machine learning.

In such an example illustrated in FIG. 12, if TRUE is decided, the flow advances to the subsequent discriminating process. Then, if the decided results of all the discriminating processes are TRUE, it is decided that the physical object exists in the relevant area. On the other hand, if any one of the decided results of the discriminating processes is FALSE, it is decided at that point that the physical object does not exist in the relevant area. As just described, the many discriminating processes are necessary to detect the physical object with high degree of accuracy. However, if the number of discriminating processes increases, the size of discrimination parameters increases.

As described above, in order to detect the physical objects of various orientations in the image with high degree of accuracy, it is desirable to respectively provide the different discriminators according to the orientations. However, if the discriminator is provided for each of detection-target orientations, the number of necessary discriminators and the size of discrimination parameters increase. For example, as illustrated in FIG. 10, if nine-classified face orientations 1001 to 1009 are provided, it is necessary to provide nine kinds of discriminators and prepare discrimination parameters for the respective discriminators.

In this connection, it has been proposed to reduce the number of discriminators and the size of discrimination parameters by commonalizing the discriminators for the orientations which are in relations of rotation and reversal. In such a method, feature quantities which are in the relations of rotation and reversal are generated, and, by using the discriminator for one orientation, the physical objects of the orientations which are in the relations of rotation and reversal in regard to the one orientation are detected. For example, in FIG. 10, the discriminators which are in the relation of rotation are commonalized, and the three kinds of discrimination parameters for, e.g., the orientations 1002, 1005 and 1008 are provided. On another front, for example, the discriminators which are in the relation of right-and-left reversal are commonalized, and the five kinds of discrimination parameters for, e.g., the orientations 1001 to 1005 are provided.

As a concrete example, the method of rotating and reversing an image and extracting feature quantities respectively from the rotated and reversed images has been proposed (see Japanese Patent No. 4628882, Japanese Patent No. 4238537, and Japanese Patent Application Laid-Open No. 2009-32022). However, in this method, since it is necessary to repetitively perform a feature quantity extracting process, processing time is prolonged.

Moreover, the method of changing a pixel position for calculating a feature quantity according to rotation and reversal has been proposed (see Japanese Patent No. 4556891, and International Publication No. WO2009/078155). In this method, it is possible to generate the feature quantities which are in the relations of rotation and reversal by changing pixel reference positions without rotating and reversing an image. However, this method is applicable only to a case where the original pixel value is referred as it is. In a case where the feature quantity in which the relation of a plurality of pixels such as LBPs (local binary patterns) is considered is extracted from the image and the feature quantity is referred, the relation of the pixels is changed by rotation and reversal. Therefore, in order to detect a physical object with high degree of accuracy, it is necessary to convert not only the reference position but also the feature quantity value.

Moreover, the method of converting a reference position of a calculated feature quantity and a value of the feature quantity according to rotation and reversal has been proposed (see Japanese Patent Application Laid-Open No. 2012-203691). In this method, the feature quantity is extracted from an image, and the feature quantities which are in the relations of rotation and reversal are generated by converting the reference position of the extracted feature quantity and the value of the feature quantity at the reference position. Here, it is necessary to provide a conversion table for converting the value of the feature quantity. In other words, since this method is premised on use of the conversion table like this, there is a problem that a cost for conversion increases when the number of bits of the feature quantity is large. For example, when the number of bits of the feature quantity is 16, it is necessary to provide the conversion table of $16 \times 2^{16} = 1$ Mbit.

Moreover, the method of managing a feature quantity which is invariant with respect to rotation and reversal has been proposed (see T. Ojala, M. Pietikainen and T. Maenpaa, "Multiresolution Gray-Scale and Rotation Invariant Texture Classification with Local Binary Patterns", IEEE Trans. on PAMI, Vol. 24, No. 7, pp. 971-987, 2002; and Q. Tao and R. Veldhuis, "Illumination Normalization Based on Simplified Local Binary Patterns for A Face Verification System", Biometrics Symposium, pp. 1-6, 2007). In this method, a process of converting the value of the feature quantity is unnecessary for extracting the feature quantity invariant with respect to rotation and reversal. However, information concerning an image directional characteristic is not included in the feature quantity. Therefore, detection accuracy for this feature quantity deteriorates as compared with the feature quantity which includes the information concerning the directional characteristic.

The present invention aims to be able to easily and accurately generate the feature quantity for detecting an object.

SUMMARY OF THE INVENTION

According to one aspect of the present invention, an object detecting apparatus comprises: an extracting unit configured to extract, from an input image, a pattern of directional characteristic indicating a pattern in which a pixel value for a predetermined direction changes for each pixel; a generating unit configured to generate a first feature quantity based on at least one of a relation in which a directional characteristic extracted by the extracting unit is rotated and a relation in which the directional characteristic is reversed with respect to an axis; a converting unit configured to convert the first feature quantity generated by the generating unit into a second feature quantity, by rotating or reversing, with respect to the axis, the first feature quantity; and a detecting unit configured to detect an object by using the first feature quantity and the second feature quantity.

Further features of the present invention will become apparent from the following description of exemplary embodiments with reference to the attached drawings.

BRIEF DESCRIPTION OF THE DRAWINGS

FIG. 2 is a block diagram illustrating an example of the detailed constitution of a feature quantity converting unit to be used when performing a right-and-left reversing process in the first embodiment.

FIG. 3 is a block diagram illustrating an example of the detailed constitution of the feature quantity converting unit to be used when performing a rotating process in the first embodiment.

FIG. 4 is a diagram illustrating an example of a positional relation of respective directional characteristics in a ULBP (Uniform Local Binary Pattern) feature quantity.

FIG. 7 is a diagram indicating an example of a discrimination parameter set in the first embodiment.

FIG. 8 is a diagram for describing a storing form to be used in a case where the ULBP feature quantity in the first embodiment is stored.

FIGS. 9A and 9B are diagrams for describing relations between previous (or original) coordinates and coordinates after rotation and right-and-left reversal.

FIG. 10 is the diagram illustrating the example of the faces of different orientations.

FIG. 11 is a flow chart indicating an example of the processing procedure to be performed by an evaluating unit in the first embodiment.

FIG. 17 is a diagram indicating an example of a discrimination parameter set in the third embodiment.

FIGS. 18A and 18B are diagrams for describing an example of histogram bin replacing in the third embodiment.

DESCRIPTION OF THE EMBODIMENTS

First Embodiment

Hereinafter, the first embodiment of the present invention will be described in detail with reference to the attached drawings. In the present embodiment, an example that physical objects (i.e., objects) of various orientations existing in an image are detected by using a pattern discriminating apparatus (i.e., an object detecting apparatus) will be described. Here, the orientation of the physical object means how the physical object is viewed in the image (or means the position of the physical object in the image), and the orientation changes according to the direction of the physical object in regard to an imaging device. Incidentally, in the present embodiment, a ULBP feature quantity is used as a feature quantity, and a boosting discriminator is used as a discriminator. However, the present invention is not limited to them. For example, the present invention is also applicable to another feature quantity which is obtained by extracting a directional characteristic pattern from an image and encoding the extracted directional characteristic pattern to a predetermined value. Also, the present invention is applicable to another discriminator such as a support vector machine, a neural network or the like.

Figure 1:
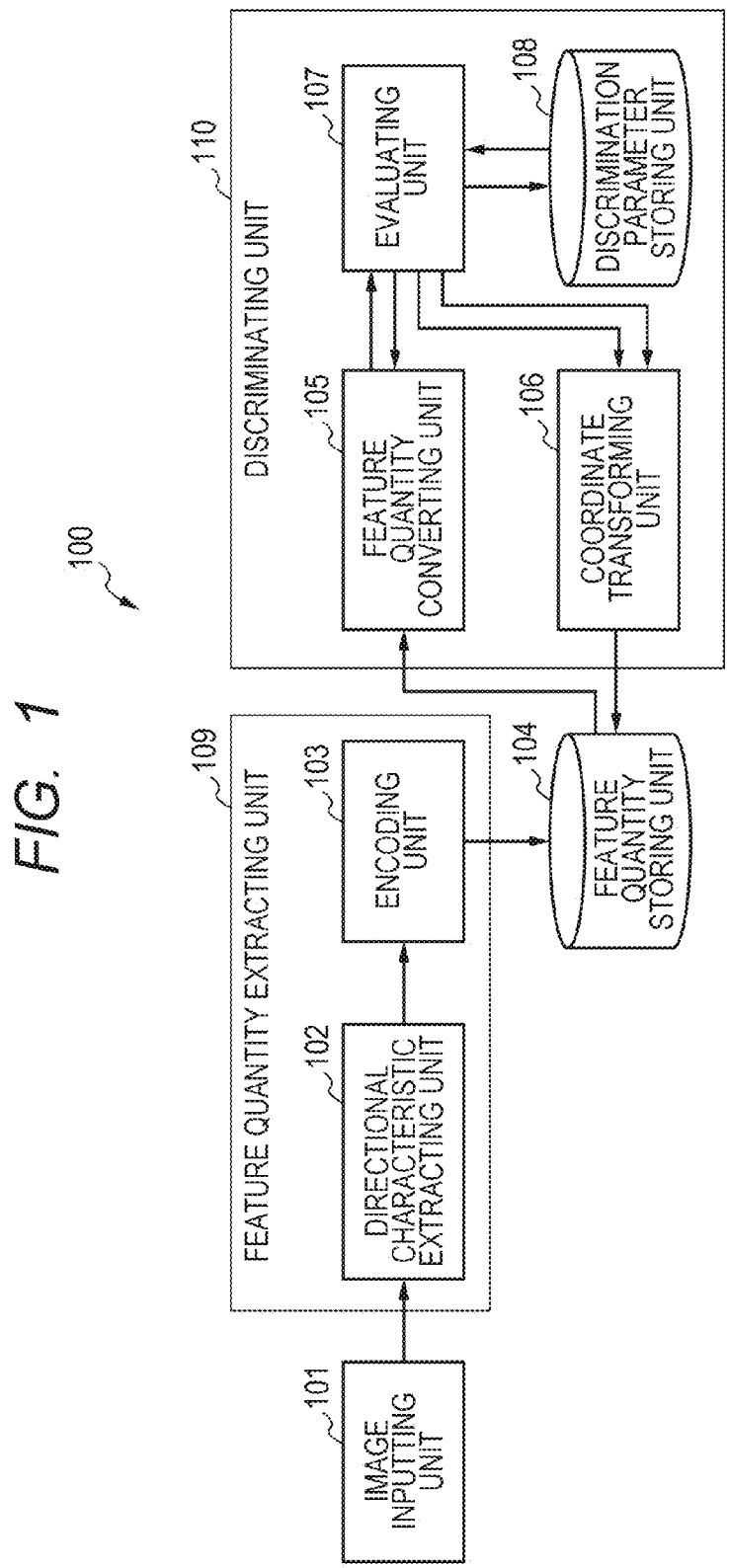
FIG. 1 is a block diagram illustrating an example of the function constitution of a pattern discriminating apparatus according to the embodiment.

FIG. 1 is a block diagram illustrating an example of the function constitution of a pattern discriminating apparatus 100 according to the present embodiment.

In FIG. 1, an image inputting unit 101 is constituted by an optical device, a photoelectric converting device, a driver circuit for controlling sensors, an AD (analog-to-digital) converter, a signal processing circuit for correcting various images, a frame buffer, and the like. A feature quantity extracting unit 109 extracts a feature quantity from the image obtained by the image inputting unit 101. Incidentally, the feature quantity extracting unit 109 is constituted by a directional characteristic extracting unit 102 and an encoding unit 103.

The directional characteristic extracting unit 102 extracts a directional characteristic pattern at each of the (x, y) coordinates in the image. Here, the directional characteristic pattern means a change pattern of a pixel value in regard to a predetermined direction. The directional characteristic pattern in the ULBP feature quantity is calculated using the following expression (1).

$$d_n(x,y)=s(i(x+x_n,y+y_n)-i(x,y)) \text{ where } s(u)=1 \text{ (if } u \geq 0), \text{ or } 0 \text{ (if } u<0) \qquad (1)$$

Here, i(x, y) indicates an input pixel value (i.e., a value of a target pixel) at the coordinates (x, y), and $d_n(x, y)$ indicates a characteristic (i.e., a directional characteristic pattern) in regard to a direction n at the coordinates (x, y). Further, the coordinates ($x_n$, $y_n$) indicate a relative position in regard to the target pixel of a reference pixel, and it is assumed that the relevant coordinates satisfy $x_n=\{-1, 0, 1\}$, $y_n=\{-1, 0, 1\}$ and $x_n^{2}+y_n^{2} \neq 0$.

As indicated by the expression (1), the directional characteristic pattern $d_n(x, y)$ in the ULBP feature quantity indicates the magnitude relation between the value i(x, y) of the target pixel and the value i(x+$x_n$, y+$y_n$) of the reference pixel in each direction. That is, if the value of the reference pixel is equal to or larger than the value of the target pixel, the characteristic of the relevant direction is "1". On the other hand, if the value of the reference pixel is not equal to or larger than the value of the target pixel, the characteristic of the relevant direction is "0". Incidentally, FIG. 4 is a diagram illustrating an example of the positional relation of the respective directional characteristics in the ULBP feature quantity. Namely, in the example of FIG. 4, the upper left position is the starting point, and characteristics $d_0$ to $d_7$ are arranged clockwise.

The encoding unit 103 assigns the value corresponding to the directional characteristic calculated by the directional characteristic extracting unit 102. The encoding unit 103 is equipped with a conversion table to which the directional characteristic pattern is input, and is stored by a known RAM (random-access memory), a register or the like. Since the number of directions is "8" and the characteristic of each direction is "0" or "1" in the directional characteristic pattern of the present embodiment, the directional characteristic pattern is expressed by eight bits. Therefore, the size of the conversion table is 256×8 bits. In the encoding process of the ULBP feature quantity, the following expression (2) is used.

$$ULBP(x, y) = \begin{cases} v(d_0(x, y), \ldots, d_7(x, y)) & \text{if } t(x, y) \leq 2 \\ 58 & \text{otherwize} \end{cases} \qquad (2)$$

Here, ULBP(x, y) indicates the ULBP feature quantity at the coordinates (x, y), and v($d_0$(x, y), . . . , $d_7$(x, y)) indicate the values assigned according to the directional characteristic patterns. Here, t(x, y) in the expression (2) is the function defined by the following expression (3), and indicates the number of changes of the adjacent directional characteristics.

$$t(x, y) = |d_0(x, y) - d_7(x, y)| + \sum_{n=1}^{7} |d_n(x, y) - d_{n-1}(x, y)| \qquad (3)$$

As indicated by the expression (2), in the encoding process of the ULBP feature quantity, the inherent value is given to the directional characteristic pattern in which the number of changes of the adjacent directional characteristics is equal to or lower than "2", and the same value is given to other directional characteristic patterns. In the present embodiment, the former directional characteristic pattern is called a uniform pattern. For example, if the directional characteristic pattern is "1110000", this pattern is the uniform pattern because the number of changes is "2". On the other hand, if the directional characteristic pattern is "00111010", this pattern is not the uniform pattern because the number of changes is "4". In the ULBP feature quantity of the present embodiment, since there are 58 kinds of uniform patterns, the values "0" to "57" are given respectively to the uniform patterns, and the value "58" is given to other patterns.

In a conventional encoding process, when values are assigned to uniform patterns, relations of rotation and reversal between the uniform patterns are not considered. Therefore, to generate a ULBP feature quantity after rotation and reversal from a previous (or original) ULBP feature quantity, a conversion table indicating the correspondence relation between the value of the previous ULBP feature quantity and the value of the ULBP feature quantity after rotation and reversal. In this case, since the values of the ULBP feature quantity are "0" to "58", the size of the conversion table necessary for rotation and reversal is 59×6 bits.

If the number of reference pixels to be used is increased, more feature quantities can be extracted, and detection accuracy of a physical object can be expected to be improved. However, if the number of reference pixels increases, also the number of uniform patterns increases, and thus the size of the conversion table necessary for rotation and reversal increases. For example, in a case where the number of reference pixels is "24", there are 554 kinds of uniform patterns, so that the size of the necessary conversion table is 555×10=5.55 kilobits.

On the other hand, in the encoding process of the present embodiment, the value is assigned in consideration of the relations of rotation and reversal between the uniform patterns, thereby enabling to generate the ULBP feature quantity after rotation and reversal from the previous ULBP feature quantity by simple calculation without using the conversion table. Hereinafter, encoding methods to be performed respectively in consideration of rotation and reversal will be described.

Figure 5:
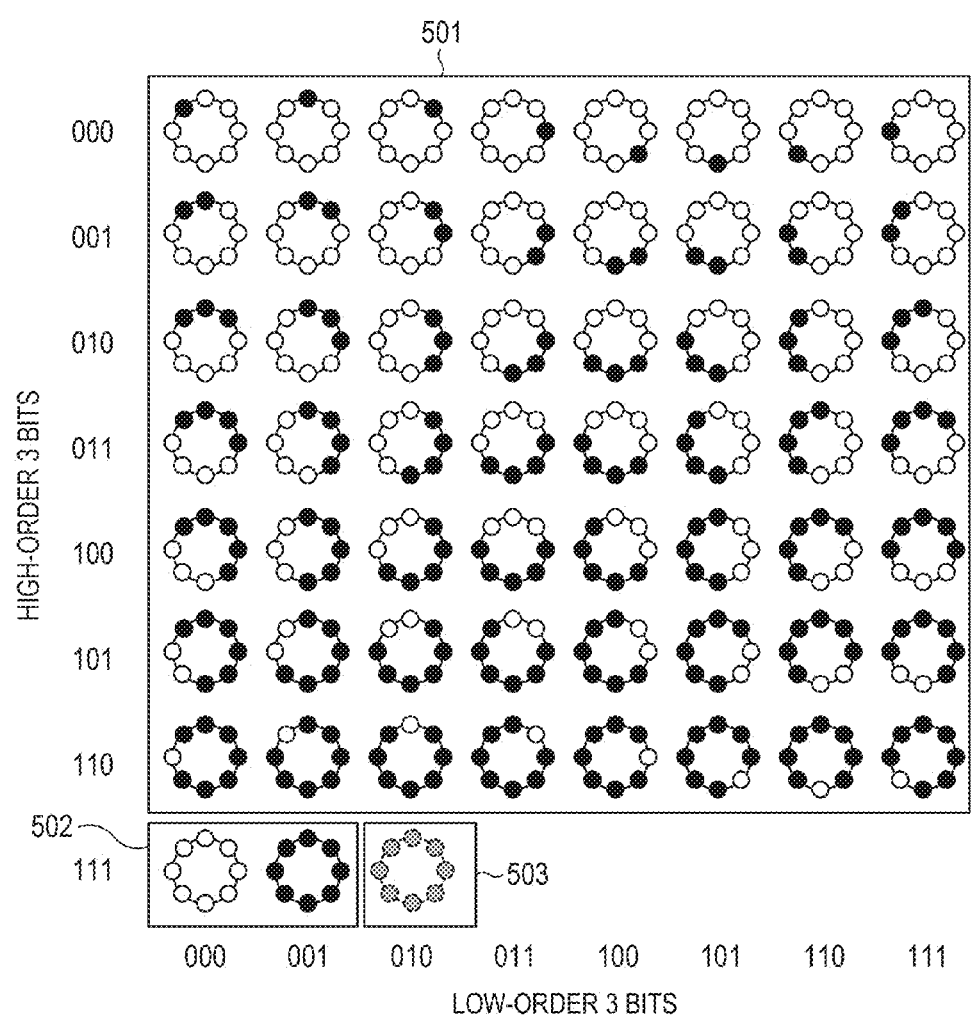
FIG. 5 is a diagram for describing an encoding method of the ULBP feature quantity in which rotation is considered, in the first embodiment.

First, the encoding method to be performed in consideration of rotation will be described. FIG. 5 is a diagram for describing the encoding method of the ULBP feature quantity in which rotation is considered. More specifically, FIG. 5 illustrates groups 501 and 502 which include 58 kinds of uniform patterns, and a group 503 which includes one kind of pattern which is not uniform (hereinafter, called a non-uniform pattern). In FIG. 5, each of the white circles indicates that the characteristic of the relevant direction is "0", and each of the black circles indicates that the characteristic of the relevant direction is "1". Each of the uniform patterns included in the group 501 is the pattern which changes if it is rotated, and each of the uniform patterns included in the group 502 is the pattern which does not change if it is rotated.

In the encoding method of the present embodiment, by adding the values according to the rotation angles to the low-order three bits, the values are assigned so as to be able to generate the rotated ULBP feature quantities. In the example of FIG. 5, in the uniform patterns included in the group 501, the eight kinds of patterns which are in the relation of rotation are given as a set. For the patterns in the same set, the high-order three bits are the same, and the values are assigned to the low-order three bits such that the value increases by "1" if the pattern is rotated clockwise by 45°.

Further, each of the uniform patterns included in the group 502 does not change if it is rotated, and the non-uniform pattern included in the group 503 is still the non-uniform pattern if it is rotated. Therefore, when the values are assigned, rotation is not considered. Moreover, it is possible to distinguish these patterns from the uniform patterns included in the group 501, by using the high-order three bits. In the example of FIG. 5, the high-order three bits of the patterns in the group 501 are given as "000" to "110", whereas the high-order three bits of the patterns in the groups 502 and 503 are given as "111".

Figure 6:
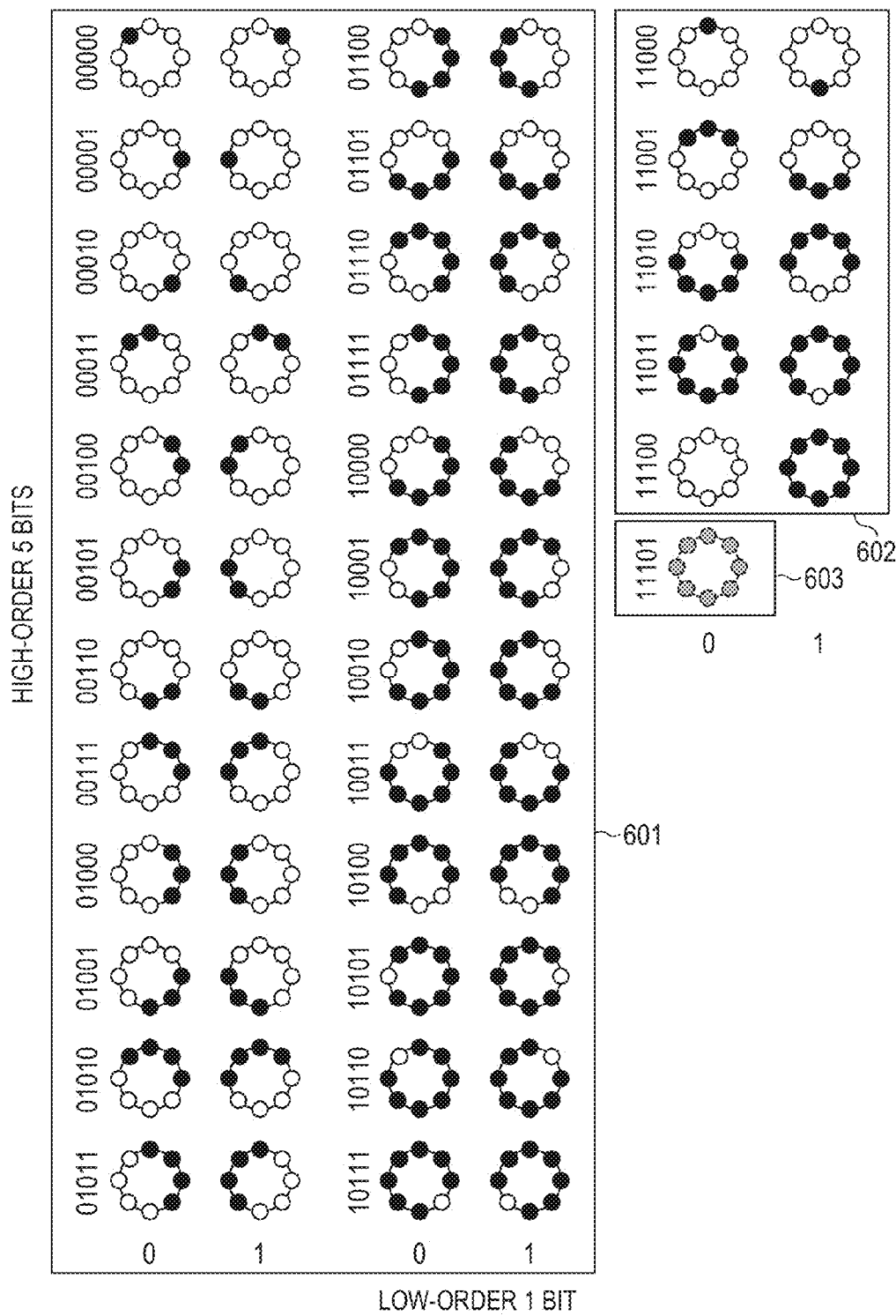
FIG. 6 is a diagram for describing an encoding method of the ULBP feature quantity in which right-and-left reversal is considered, in the first embodiment.

Next, the encoding method to be performed in consideration of reversal will be described. FIG. 6 is a diagram for describing the encoding method of the ULBP feature quantity in which reversal is considered. More specifically, FIG. 6 illustrates a group 601 which includes uniform patterns each of which changes if it is reversed right and left, a group 602 which includes uniform patterns each of which does not change if it is reversed right and left, and a group 603 which includes a non-uniform pattern.

In the encoding method of the present embodiment, encoding is performed so as to obtain the ULBP feature quantity which is reversed right and left by performing bit reversal to the low-order one bit. In the example of FIG. 6, for the uniform patterns included in the group 601, the two kinds of patterns which are in the relation of right-and-left reversal are given as a set. For the patterns included in the same set, the high-order five bits of each pattern are the same, and the values are assigned such that the low-order one bit of the one pattern is different from that of the other pattern.

Each of the uniform patterns included in the group 602 does not change if it is reversed right and left. Moreover, the non-uniform pattern included in the group 603 is still the non-uniform pattern if it is reversed right and left. Therefore, when the values are assigned, right-and-left reversal is not considered. Moreover, it is possible to distinguish these patterns from the uniform patterns included in the group 601, by using the high-order five bits. In the example of FIG. 6, the high-order five bits of the patterns in the group 601 are given as "00000" to "10111", whereas the high-order five bits of the patterns in the groups 602 and 603 are given as "11000" to "11101".

Figure 13:
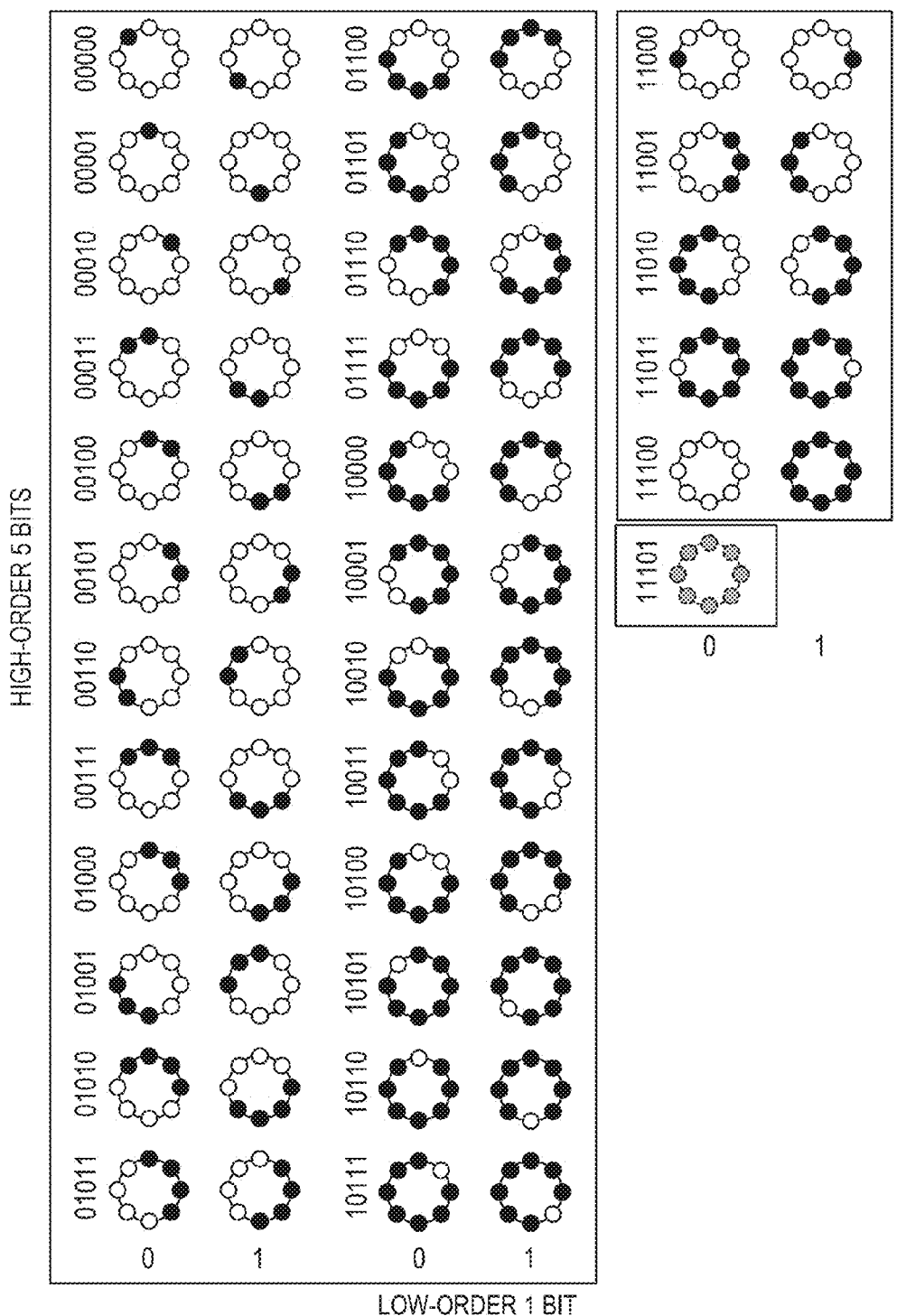
FIG. 13 is a diagram for describing an encoding method of the ULBP feature quantity in which up-and-down reversal is considered, in the first embodiment.

FIG. 13 is a diagram for describing the encoding method of the ULBP feature quantity in which up-and-down reversal is considered. As well as the case of right-and-left reversal, the two kinds of patterns which are in the relation of up-and-down reversal are given as a set. For the patterns included in the same set, the high-order five bits are the same, and the values are assigned such that the low-order one bit of the one pattern is different from that of the other pattern. Hereinafter, although only the right-and-left reversal will be described as the process for reversal, the same process is applicable also to the up-and-down reversal.

FIG. 1 will be described again. A feature quantity storing unit 104, which stores the ULBP feature quantity generated by the encoding unit 103, is constituted by a known RAM, a register or the like.

FIG. 8 is a diagram for describing a storing form to be used in a case where the ULBP feature quantity according to the present embodiment is stored in the feature quantity storing unit 104. In the present embodiment, when the size of an input image is W×H, the ULBP feature quantity for the peripheral one pixel cannot be calculated. For this reason, the size of the ULBP feature quantity is (W−2)×(H−2). The ULBP feature quantities arranged in order of raster are stored as a one-dimensional arrangement in the feature quantity storing unit 104.

A discriminating unit 110 detects the physical object in the image by referring to the ULBP feature quantity stored in the feature quantity storing unit 104. In the present embodiment, an area is first set in the image, and it is then decided whether or not the physical object exists in the set area. Hereinafter, this area will be called a detection area. Incidentally, the discriminating unit 110 is constituted by a feature quantity converting unit 105, a coordinate transforming unit 106, an evaluating unit 107 and a discrimination parameter storing unit 108. Hereinafter, the respective units of the discriminating unit 110 will be described in detail.

The feature quantity converting unit 105 reads the ULBP feature quantity from the feature quantity storing unit 104, converts the read ULBP feature quantity by rotating or reversing it, generates the ULBP feature quantity after rotation and reversal, and then outputs the generated ULBP feature quantity to the evaluating unit 107. Hereinafter, the contents of the process of generating the ULBP feature quantity after rotation and reversal from the previous ULBP feature quantity and the constitution for achieving the relevant process will be described. Incidentally, in the following description, ULBP(x, y) will be simply expressed as ULBP for visibility of expressions.

First, the content of the rotating process and the constitution for achieving the process will be described. When the encoding method illustrated in FIG. 5 is applied to the encoding unit 103, the following conversion expression (4) is used to generate the ULBP feature quantity after rotation.

$$rot_\theta(ULBP) = \begin{cases} \{ULBP[5:3], (ULBP[2:0] + \theta)[2:0]\} & \text{if } ULBP[5:3] \le 6 \\ ULBP & \text{otherwize} \end{cases} \quad (4)$$

Here, θ indicates the rotation angle (θ=0, 1, . . . , 7), and $rot_\theta$(ULBP) indicates the ULBP feature quantity after rotation by the rotation angle θ. Further, p[a:b] indicates that the a-th bit to the b-th bit in p are selected. For example, when p="011010" in binary, p[2:0]="010", and p[5:3]="011". Further, {$p_1$, $p_2$} indicates that bit connection is performed between $p_1$ and $p_2$. For example, when $p_1$=110, and $p_2$=101 in binary, {$p_1$, $p_2$}="110101" in binary. Incidentally, the rotation angle θ indicates each 45° clockwise rotation. That is, θ=0, 1, . . . , and 7 correspond to 0°, 45°, . . . , and 315° clockwise rotations, respectively.

Further, ULBP[5:3]≤6 indicates that the high-order three bits are "000" to "110". That is, this indicates that, in FIG. 5, the rotating process is performed for the ULBP feature quantity included in the group 501, whereas the input value is output as it is for the ULBP feature quantity included in the group 502 or 503.

FIG. 3 is a block diagram illustrating an example of the detailed constitution of the feature quantity converting unit 105 to be used when performing the rotating process indicated by the expression (4).

In FIG. 3, a comparing unit 301 decides whether or not ULBP[5:3]≤6 in the expression (4), and transfers the decided result to a rotation processing unit 302. If the decided result received from the comparing unit 301 is "true", the rotation processing unit 302 generates the value obtained by rotating the input ULBP feature quantity according to the upper-stage expression in the expression (4).

Here, the rotation angle θ is the value which is determined according to the detection-target orientation, and this value is received from the evaluating unit 107. More specifically, the evaluating unit 107 sets θ=0 when detecting the physical object of the target orientation, and sets θ=1 when detecting the physical object of the orientation rotated, e.g., by 45° from the target orientation. On the other hand, if the decided result received from the comparing unit 301 is "false", the value of the input ULBP feature quantity is output as it is irrespective of the value of the rotation angle θ.

Next, the content of the right-and-left reversing process and the constitution for achieving the process will be described. When the encoding method illustrated in FIG. 6 is applied to the encoding unit 103, the following conversion expression (5) is used to generate the ULBP feature quantity after right-and-left reversal.

$$ref(ULBP) = \begin{cases} \{ULBP[5:1], \sim ULBP[0]\} & \text{if } ULBP[5:1] \leq 23 \\ ULBP & \text{otherwise} \end{cases} \quad (5)$$

Here, ref(ULBP) indicates the ULBP feature quantity after right-and-left reversal, and "~" is the symbol indicating bit reversal. Further, ULBP[5:1]≤23 indicates that the high-order five bits are "00000" to "10111". That is, in FIG. 6, the right-and-left reversing process is performed for the ULBP feature quantity included in the group 601, whereas the input value is output as it is for the ULBP feature quantity included in the group 602 or 603.

FIG. 2 is a block diagram illustrating an example of the detailed constitution of the feature quantity converting unit 105 to be used when performing the right-and-left reversing process indicated by the expression (5).

In FIG. 2, a comparing unit 201 decides whether or not ULBP[5:1]≤23 in the expression (5), and transfers the decided result to a right-and-left reversal processing unit 202. If the decided result received from the comparing unit 201 is "true" and a signal instructing right-and-left reversal is received from the evaluating unit 107, the right-and-left reversal processing unit 202 outputs the value obtained by right-and-left reversing the input ULBP feature quantity according to the upper-stage expression in the expression (5).

Here, the evaluating unit 107 instructs not to perform the right-and-left reversal in case of detecting the physical object of the target orientation, whereas instructs to perform the right-and-left reversal in case of detecting the physical object of the orientation obtained by right-and-left reversing the target orientation. If the decided result received from the comparing unit 201 is "false" or if a signal instructing not to perform the right-and-left reversal is received from the evaluating unit 107, the value of the input ULBP feature quantity is output as it is.

The coordinate transforming unit 106 calculates the coordinates rotated or reversed by a predetermined angle, based on the coordinates in the detection area received from the evaluating unit 107 and the position information (upper left coordinates and size) of the detection area. Incidentally, the evaluating unit 107 instructs the rotation angle and whether or not to perform reversal.

FIG. 9A is a diagram for describing a relation between a previous (or original) coordinate and coordinates after rotation, and FIG. 9B is a diagram for describing a relation between a previous (or original) coordinate and a coordinate after right-and-left reversal. In FIG. 9A, a coordinate 901 in a detection area 910 is the previous coordinate and coordinates 902 to 908 are the coordinates respectively rotated clockwise by 45° to 315°. In FIG. 9B, a coordinate 909 is the coordinate reversed right and left. Incidentally, if the coordinate after rotation is not given by an integer, the closest coordinate is used instead.

The coordinate transforming unit 106 calculates, from the generated coordinates, the address of the ULBP feature quantity to be referred, and transfers the calculated address to the feature quantity storing unit 104. For example, if the generated coordinates are (x, y), the address to be transferred to the feature quantity storing unit 104 is y×(W−2)+x. The feature quantity storing unit 104 transfers the ULBP feature quantity stored at the address received from the coordinate transforming unit 106, to the feature quantity converting unit 105.

The discrimination parameter storing unit 108, which is the memory for storing discrimination parameters to be used for detecting the physical object, is constituted by a known RAM, a register or the like.

Figure 12:
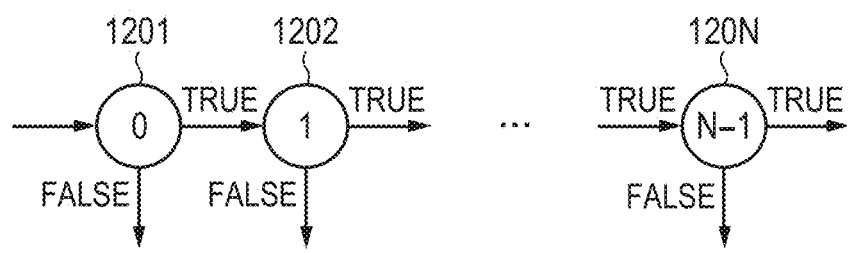
FIG. 12 is the diagram illustrating the processing flow by the boosting discriminator.

FIG. 7 is a diagram indicating an example of the discrimination parameter set in the present embodiment. Here, the discrimination parameter set is the set of the discrimination parameters to be used for detecting the physical object of one orientation. In the present embodiment, it is assumed that a discriminator having the constitution illustrated in FIG. 12 is used. Here, the symbol "i" illustrated in FIG. 7 indicates the values corresponding to the discriminating process numbers in FIG. 12. The discrimination parameter corresponding to each discriminating process is composed of the coordinates of the feature quantity to be referred in the detection area, the conversion table for calculating the evaluation value indicating likelihood of the detection target from the value of the feature quantity at the coordinates, and a threshold for deciding whether or not the physical object exits.

The discrimination parameter is created using a previously prepared learning sample by a known machine learning method such as boosting or the like. In the present embodiment, although the different discrimination parameter set is prepared according to the orientation of the physical object, the discrimination parameter sets for all the orientations are not created. That is, only the discrimination parameter set for one of the orientations is created if they are in the relation of rotation or reversal.

For example, in a case where a face is classified into nine kinds of orientations as illustrated in FIG. 10, if the discrimination parameters which are in the relation of rotation are commonalized, the discrimination parameter set commonalized by the three kinds of orientations 1002, 1005 and 1008 is created. Further, if the discrimination parameters which are in the relation of right-and-left reversal are commonalized, the discrimination parameter set commonalized by the five kinds of orientations 1001 to 1005 is created. To create the discrimination parameter for each orientation, the learning sample is classified according to the orientations, and the discrimination parameter sets for the respective orientations are created using the classified learning samples.

The evaluating unit 107 decides whether or not the physical object exits in each detection area set in the image on the basis of the discrimination parameter and the feature quantity.

FIG. 11 is a flow chart indicating an example of the processing procedure to be performed by the evaluating unit 107. In the present embodiment, the evaluating unit 107 performs the discriminating process for an orientation in regard to the set detection area. If the physical object is detected, the discriminating process for another orientation is not performed, and the process for the next detection area is performed. On the other hand, if the physical object is not detected, the evaluating unit 107 performs the discriminating process for another orientation. Hereinafter, the processes of respective steps will be described.

First, in S1101, the evaluating unit 107 decides whether or not all the detection areas have been processed. If it is decided that all the detection areas have been processed, the process is ended immediately. On the other hand, if it is decided in S1101 that the detection area not yet processed exists, the processing procedure is advanced to S1102.

Next, in S1102, the evaluating unit 107 sets a new detection area in the image. In the present embodiment, the detection areas are sequentially set by moving a predetermined-sized rectangular area in order of raster. Then, in S1103, the evaluating unit 107 decides whether or not the discriminating process for all the orientations is ended. If it is decided that the discriminating process is ended, since the process for the relevant detection area is ended, the processing procedure is returned to S1101. On the other hand, if it is decided in S1103 that the orientation for which the discriminating process is not yet ended exists, the processing procedure is advanced to S1104. In this step, the evaluating unit 107 switches the discrimination parameter set to be used to that for detecting the new orientation.

Next, in S1105, the evaluating unit 107 decides whether or not the discrimination process of the orientation being in the relation of rotation or right-and-left reversal is ended for the orientation being the detection target of the discrimination parameter set in S1104. If it is decided that the discrimination process of the orientation being in the relation of rotation or right-and-left reversal is ended, since the process using the relevant discrimination parameter set is ended, the processing procedure is returned to S1103. On the other hand, if it is decided in S1105 that the discrimination process of the orientation being in the relation of rotation or right-and-left reversal is not yet ended, the processing procedure is advanced to S1106.

In S1106, the evaluating unit 107 sets the rotation angle or whether or not to perform right-and-left reversal. For example, in a case where the nine kinds of orientations illustrated in FIG. 10 are set as the detection targets and the discrimination parameter sets of the three kinds of orientations 1002, 1005 and 1008 are prepared by commonalizing the dictionaries being in the relation of rotation, the rotation angles are set in order of "0" (no rotation), "1" (45°) and "7" (315°). Moreover, in a case where the discrimination parameter sets of the five kinds of orientations 1001 to 1005 are prepared by commonalizing the dictionaries being in the relation of right-and-left reversal, the orientations 1001 to 1004 are set in order of no right-and-left reversal and right-and-left reversal. Since the orientation 1005 does not change if it is reversed right and left, only no right-and-left reversal is set. As described above, the evaluating unit 107 transfers a signal indicating the rotation angle or whether or not to perform right-and-left reversal, to the feature quantity converting unit 105 and the coordinate transforming unit 106.

Next, in S1107, the evaluating unit 107 initializes the value of the discriminating parameter number "i" read from the discrimination parameter storing unit 108 and the accumulated evaluation value (eval). Then, in S1108, if the number of the discrimination parameters included in the discrimination parameter set obtained in S1104 is Np, the evaluating unit 107 decides whether or not all the Np discrimination parameters have been used. If it is decided that all the Np discrimination parameters have been used, such a result means that the processing procedure passes through all the discriminating processes by the constitution illustrated in FIG. 12. Thus, in this case, it is decided that the target object exists in the current detection area, and the processing procedure is returned to S1101 to perform the process for the next detection area. On the other hand, if it is decided in S1108 that the discrimination parameter still remains, the processing procedure is advanced to S1109.

In S1109, the evaluating unit 107 updates the accumulated evaluation value (eval). First, the i-th discrimination parameter is read, the coordinates in the discrimination parameter and the position information (upper left coordinates and size) of the detection area are transferred to the coordinate transforming unit 106. Then, the evaluating unit 107 calculates the evaluation value by using the value of the feature quantity received from the feature quantity converting unit 105 and an evaluation value calculation table in the discrimination parameter, and adds the calculated evaluation value to the accumulated evaluation value.

In S1110, the evaluating unit 107 decides whether or not the accumulated evaluation value is smaller than the i-th threshold ($T_{hi}$). If it is decided that the accumulated evaluation value is smaller than the i-th threshold, then it is decided that the physical object of the current-target orientation does not exist, and the processing procedure is returned to S1105 to perform the process for the next orientation. On the other hand, if it is decided in S1110 that the accumulated evaluation value is equal to or higher than the i-th threshold, then in S1111 the evaluating unit 107 increments the value of "i" to perform the next discriminating process, and the processing procedure is returned to S1108.

As described above, according to the present embodiment, in the process of detecting the physical object in the image, the encoding is performed to be able to generate the feature quantity after rotation and reversal by the simple calculation such as the addition and the bit reversal. Thus, in the case where the discrimination parameters which are in the relations of rotation and reversal with respect to an axis, it is possible to reduce the costs necessary for converting the feature quantities.

Second Embodiment

In the second embodiment, only the portions different from those in the first embodiment will be described. In the first embodiment, the encoding method and the feature quantity converting method to be performed in consideration of only one of rotation, right-and-left reversal and up-and-down reversal of the feature quantity have been described. On the other hand, in the present embodiment, an example of the encoding method and the feature quantity converting method to be performed in consideration of all of such patterns will be described. The present embodiment is applicable to a case where the directional characteristic patterns which are in the relation of reversal are included in the directional characteristic patterns which are in the relation of rotation. Incidentally, it is assumed that such a condition is satisfied if the directional characteristic is given as a binary value.

A case to which the method of the present embodiment is applied will be described. When the faces of the nine kinds of orientations illustrated in FIG. 10 are set as the detection targets, only the discrimination parameters for the two kinds of orientations 1002 and 1005 may be prepared. Namely, it is possible to further reduce the discrimination parameters as compared with the case where only rotation or reversal is considered.

Figure 14:
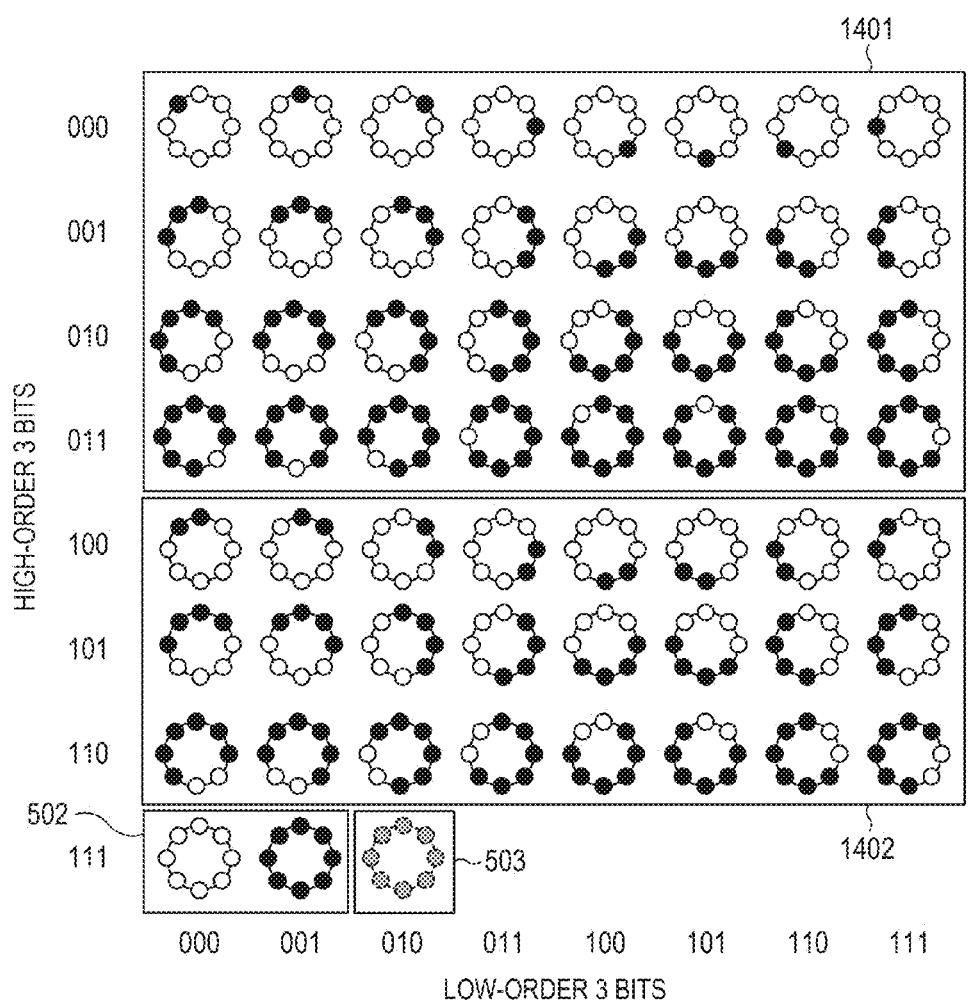
FIG. 14 is a diagram for describing an encoding method in which rotation, right-and-left reversal and up-and-down reversal are considered, in the second embodiment.

FIG. 14 is a diagram for describing the encoding method of the present embodiment in which rotation, right-and-left reversal and up-and-down reversal are considered. In the encoding method of the present embodiment, on the basis of the encoding method of FIG. 5 in which rotation is considered, groups 1401 and 1402 in which changes of the low-order three bits are the same in the right-and-left reversal and the up-and-down reversal are provided. For example, with respect to the right-and-left reversal, in the uniform patterns included in the group 1401, "000" and "010", "011" and "111", and "100" and "110" are respectively in the relation of right-and-left reversal. The patterns of "001" and "101" do not change if they are inverted right and left. On the other hand, in the uniform patterns included in the group 1402, "000" and "001", "010" and "111", "011" and "110", and "100" and "101" are respectively in the relation of right-and-left reversal. The groups 1401 and 1402, and the groups 502 and 503 descried in the first embodiment, can be discriminated by using the high-order three bits.

Figure 15:
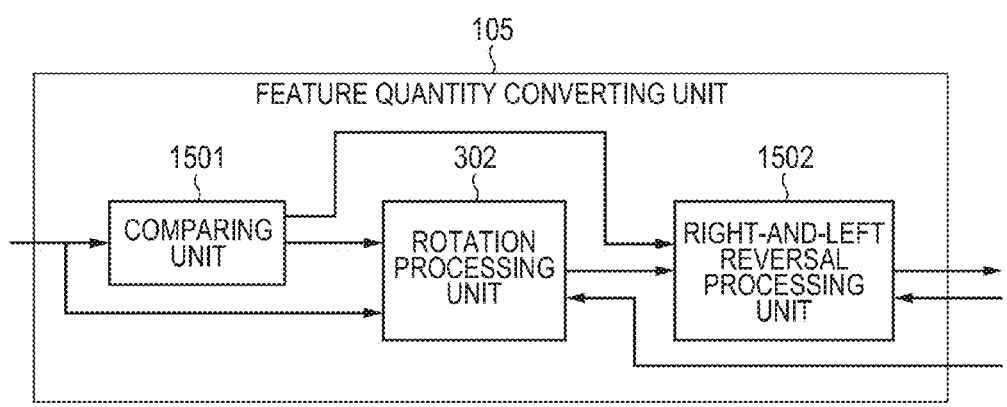
FIG. 15 is a block diagram illustrating an example of the detailed constitution of the feature quantity converting unit to be used when performing a rotating process and a right-and-left reversing process in the second embodiment.

FIG. 15 is a block diagram illustrating an example of the detailed constitution of the feature quantity converting unit 105 in the present embodiment.

In FIG. 15, a comparing unit 1501 decides, based on the high-order three bits of the input ULBP feature quantity, in which group of FIG. 14 the input ULBP feature quantity is included. Then, the comparing unit 1501 transmits, to the rotation processing unit 302, a signal indicating whether or not the ULBP feature quantity is included in the group 1401 or the group 1402 (whether or not ULBP[5:3]≤6 is established). Further, the comparing unit transmits, to a right-and-left reversal processing unit 1502, a signal indicating in which of the group 1401 satisfying ULBP[5:3]≤3, the group 1402 satisfying 3<ULBP[5:3]≤6 and the groups 502 and 503 satisfying ULBP[5:3]>6 the ULBP feature quantity is included.

As well as the first embodiment, the rotation processing unit 302 performs the rotating process according to the expression (4), and transmits the ULBP feature quantity $rot_\theta(ULBP)$ after the rotating process to the right-and-left reversal processing unit 1502. Then, the right-and-left reversal processing unit 1502 generates the ULBP feature quantity $ref(rot_\theta(ULBP))$ obtained by reversing the ULBP feature quantity $rot_\theta(ULBP)$ right and left according to the following expression (6).

$$ref(rot_\theta(ULBP)) = \begin{cases} \{rot_\theta(ULBP)[5:3], lut_1(rot_\theta(ULBP)[2:0])\} & \text{if } ULBP[5:3] \le 3 \\ \{rot_\theta(ULBP)[5:3], lut_2(rot_\theta(ULBP)[2:0])\} & \text{if } 3 < ULBP[5:3] \le 6 \\ rot_\theta(ULBP) & \text{otherwise} \end{cases} \quad (6)$$

Here, $lut_1$ and $lut_2$ respectively indicate the processes by the conversion tables on which the correspondence relation of the low-order three bits before and after right-and-left reversal of the ULBP feature quantities included in the groups 1401 and 1402. If the signal indicating the right-and-left reversal is received from the evaluating unit 107, the right-and-left reversal processing unit 1502 outputs the value right-and-left reversed according to either of the calculations in the expression (6), based on the signal received from the comparing unit 1501. On the other hand, if the signal indicating no right-and-left reversal is received from the evaluating unit 107, the value of the input ULBP feature quantity $rot_\theta(ULBP)$ is output as it is.

It is possible, by the above encoding method and the constitution of the feature quantity converting unit 105, to generate the ULBP feature quantity after rotation and right-and-left reversal. Further, it is possible to generate the ULBP feature quantity after up-and-down reversal, by the right-and-left reversal after 180° rotation. Incidentally, although the processes are performed in order of the rotating process and the right-and-left reversing process in the present embodiment, this order may be reversed. Further, it may be possible to use an up-and-down processing unit instead of the right-and-left reversal processing unit 1502.

As described above, according to the present embodiment, the encoding is performed in consideration of the relations of rotation, right-and-left reversal and up-and-down reversal. Therefore, it is possible to reduce the size of the discrimination parameter as compared with the first embodiment.

Third Embodiment

In the third embodiment, only the portions different from those in the first and second embodiments will be described. In the first and second embodiments, the ULBP feature quantity after rotation and reversal is generated by converting the value of the ULBP feature quantity according to the predetermined calculation expressions. In the present embodiment, a histogram indicating a frequency that each value of the ULBP feature quantity in a predetermined area appears is generated, and bins of the generated histogram are replaced according to a predetermined calculation expression, thereby generating the histogram after rotation and reversal.

FIG. 17 is a diagram indicating an example of the discrimination parameter set in the present embodiment. As shown in FIG. 17, it is assumed that area information for calculating the histogram is composed of the upper left coordinates, the width and the height. Further, the values each obtained by multiplying each bin of the histogram by a coefficient are added together, thereby obtaining an evaluation value.

Further, in the constitution illustrated in FIG. 1, the evaluating unit 107 reads the discrimination parameter from the discrimination parameter storing unit 108, and transfers the area information to the coordinate transforming unit 106. Further, the evaluating unit calculates the area size (width× height) from the area information, and transfers the calculated area size to the feature quantity converting unit 105. Moreover, as well as the process in S1106 of FIG. 11 in the first embodiment, the evaluating unit determines the rotation angle or whether or not to perform reversal, and transfers the result to the feature quantity converting unit 105 and the coordinate transforming unit 106.

The coordinate transforming unit 106 first calculates the coordinates included in the area from the area information received from the evaluating unit 107. Next, based on the signal indicating the rotation angle or whether or not to perform reversal received from the evaluating unit 107, the coordinate transforming unit performs coordinate transformation for the calculated coordinates sequentially, and transfers the address indicating the transformed coordinate position to the feature quantity storing unit 104.

The feature quantity converting unit 105 calculates the histogram from the ULBP feature quantity in the area received from the feature quantity storing unit 104, performs rotating and reverting processes to the histogram based on the signal indicating the rotation angle or whether or not to perform reversal received from the evaluating unit 107, and transfers the obtained result to the evaluating unit 107.

Figure 16:
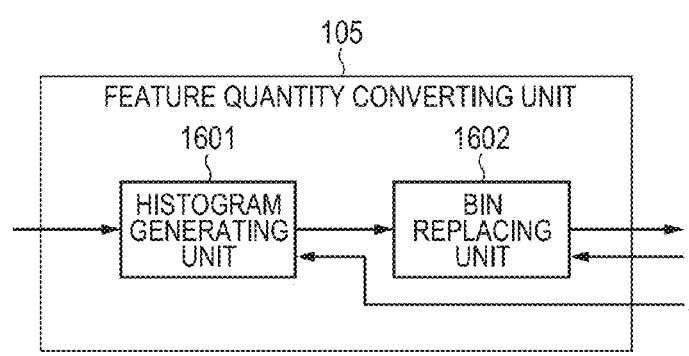
FIG. 16 is a block diagram illustrating an example of the detailed constitution of the feature quantity converting unit in the third embodiment.

FIG. 16 is a block diagram illustrating an example of the detailed constitution of the feature quantity converting unit 105 in the present embodiment.

In FIG. 16, a histogram generating unit 1601 generates the histogram from the received ULBP feature quantity. Here, each bin of the histogram corresponds to the value of the ULBP feature quantity. If the ULBP feature quantity is received, the histogram generating unit 1601 adds "1" to the frequency value in the corresponding bin. Then, the histogram generating unit 1601 generates the histogram from the ULBP feature quantity corresponding to the area size received from the evaluating unit 107, and transfers the generated histogram to a bin replacing unit 1602.

The bin replacing unit 1602 replaces the bins according to the rotation angle or the reversal direction designated by the evaluating unit 107. However, if the rotation angle is 0° or the signal indicating no reversal is received, the histogram in which the bins are not replaced is output as it is. Then, the bin replacing unit 1602 sets the frequency value in each bin as the frequency value of the bin corresponding to the feature quantity after rotation and reversal, according to the ULBP feature quantity converting method described in the first and second embodiments.

FIGS. 18A and 18B are diagrams for describing an example of histogram bin replacing. More specifically, the diagrams show an example of the bin replacing to be performed when the histogram of the ULBP feature quantity is rotted by 45°. FIG. 18A shows the histogram before bin replacing, and FIG. 18B shows the histogram after bin replacing. If the bin replacing is performed according to the conversion expression (4), each bin of LBP[5:3]≤6 is moved to the position obtained by adding only "1" to the low-order three bits. On the other hand, the bins 56, 57 and 58 are not moved.

As described above, according to the present embodiment, when the physical object in the image is detected using the histogram, the encoding is performed to be able to generate the histogram after rotation and reversal by the simple calculations such as the addition and the bit reversal. Thus, in case of commonalizing the discrimination parameters being in the relations of rotation and right-and-left reversal, it is possible to reduce the costs necessary for converting the histogram.

OTHER EMBODIMENTS

In each of the first to third embodiments, the example that the ULBP feature quantity is used as the feature quantity has been described. However, the present invention is not limited to this. In the ULBP feature quantity, the characteristic in each direction is extracted using the two pixels of the target pixel and the reference pixel. However, the characteristic in each direction may be extracted using the target pixel and the plurality of reference pixels. Alternatively, the characteristic in each direction may be extracted using the plurality of reference pixels without using the target pixel. Besides, the characteristic may be extracted not using only the pixel at the specific position but using an average value of the pixels in a predetermined area.

Moreover, in the ULBP feature quantity, the characteristic in each direction is given by a binary value of "0" or "1". However, a feature quantity in which the characteristic in each direction is given by multi-values may be used. In this case, for example, it is possible to directly use difference values between pixels and between areas, and values obtained by multiplying a pixel and an area by a predetermined coefficient are adding them together, and the like. Alternatively, it is possible to use a value obtained by quantizing these values into M (M≥2) values according to a predetermined rule. Hereinafter, the encoding method and the feature quantity converting method in a case where the characteristic in each direction can have three-values of "0", "1" and "2" will be described.

Figure 19:
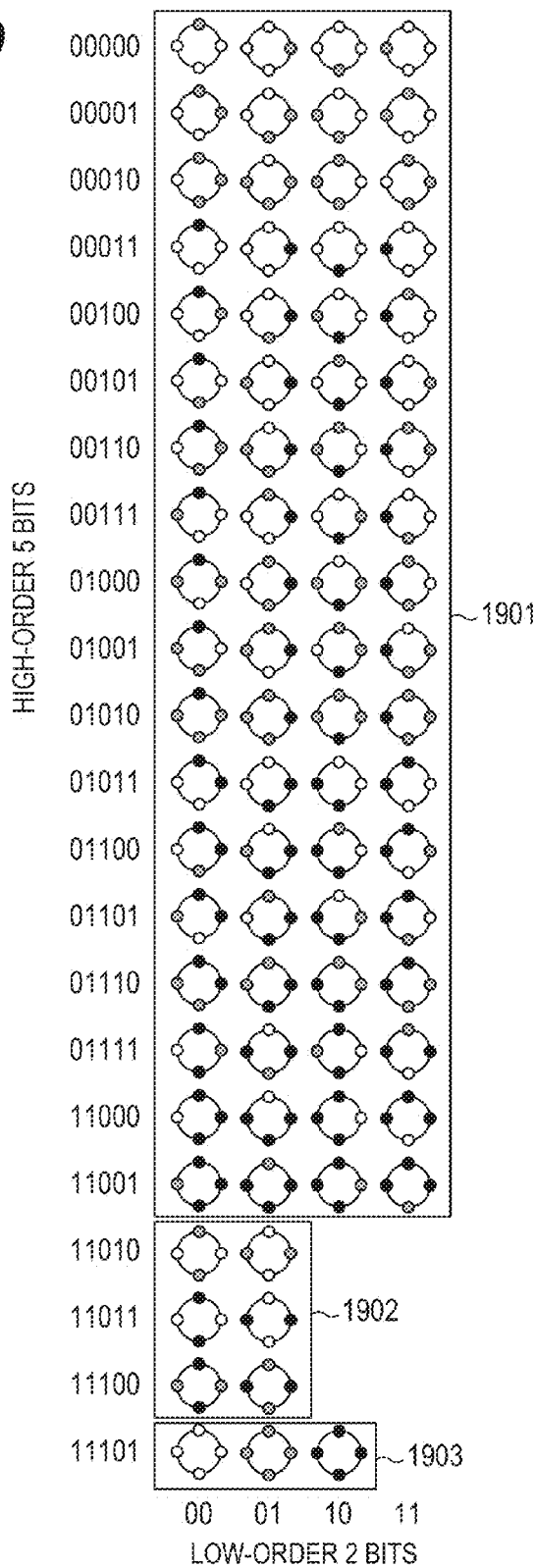
FIG. 19 is a diagram for describing an encoding method of a feature quantity in which rotation is considered, in another embodiment.

FIG. 19 is a diagram for describing the encoding method of the feature quantity in which rotation is considered, in the case where the characteristic in each direction have the three-values of "0", "1" and "2". Incidentally, in the example shown in FIG. 19, the number of directional characteristic is "4". In FIG. 19, the white circles, the gray (shadow) circles and the black circles indicate that the respective directional characteristics are "0", "1" and "2". Further, the number of patterns is "81" (=$3^4$).

A group 1901 shown in FIG. 19 is the group in which the patterns change by rotation, and a group 1902 is the group in which the patterns change by 90° and 270° rotations but do not change by 180° rotation. Further, a group 1903 is the group in which the patterns do not change by rotation. By applying the encoding method illustrated in FIG. 19, as well as the first embodiment, it is possible to generate the feature quantity after rotation by deciding the group with comparison of the high-order five bits and adding the value to the low-order two bits according to the rotation angle.

Besides, by applying the encoding method in which the patterns being in the relation of reversal are paired with each other, it is possible to apply the converting method same as that in the first embodiment to the right-and-left reversal and the up-and-down reversal. Likewise, it is possible to apply the method using the histogram as described in the third embodiment. Incidentally, although the number of directions is "4" in the example shown in FIG. 19, the number of directions is not limited. Moreover, although the different values are assigned respectively to all the directional characteristic patterns in the above description, it is possible to assign the same value to the different directional characteristic patterns according to a predetermined condition such as the ULBP feature quantity.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-069687, filed Mar. 28, 2014, which is hereby incorporated by reference herein in its entirety.

What is claimed is:

1. An object detecting apparatus comprising:
an extracting unit configured to extract, from an input image, a pattern of directional characteristic indicating a pattern in which a pixel value for a predetermined direction changes for each pixel;
a generating unit configured to generate a first feature quantity based on at least one of a relation in which a directional characteristic extracted by the extracting unit is rotated and a relation in which the directional characteristic is reversed with respect to an axis;
a converting unit configured to convert the first feature quantity generated by the generating unit into a second feature quantity, by rotating or reversing, with respect to the axis, the first feature quantity; and
a detecting unit configured to detect an object by using the first feature quantity and the second feature quantity.

2. The object detecting apparatus according to claim 1, wherein the converting unit converts the first feature quantity into the second feature quantity by calculation based on at least one of the relation in which the directional characteristic is rotated and the relation in which the directional characteristic is reversed with respect to the axis.

3. The object detecting apparatus according to claim 2, wherein the converting unit converts the first feature quantity into the second feature quantity by calculation using a value corresponding to a rotation angle.

4. The object detecting apparatus according to claim 2, wherein the converting unit converts the first feature quantity into the second feature quantity by assigning a value by which the directional characteristic is reversed right and left.

5. The object detecting apparatus according to claim 2, wherein the converting unit converts the first feature quantity into the second feature quantity by assigning a value by which the directional characteristic is reversed up and down.

6. The object detecting apparatus according to claim 2, wherein the converting unit converts the first feature quantity into the second feature quantity by performing calculation using a value corresponding to a rotation angle and further assigning a value by which the directional characteristic is reversed right and left or up and down.

7. The object detecting apparatus according to claim 1, wherein
the converting unit further comprises
a histogram generating unit configured to generate a first histogram indicating a frequency that each value of the first feature quantity appears, and
a replacing unit configured to generate a second histogram indicating a frequency that each value of the second feature quantity appears, by replacing bins of the first histogram, and
the detecting unit detects the object by using the first histogram and the second histogram.

8. An object detecting method comprising:
extracting, from an input image, a pattern of directional characteristic indicating a pattern in which a pixel value for a predetermined direction changes for each pixel;
generating a first feature quantity based on at least one of a relation in which an extracted directional characteristic is rotated and a relation in which the extracted directional characteristic is reversed with respect to an axis;
converting the generated first feature quantity into a second feature quantity, by rotating or reversing, with respect to the axis, the first feature quantity; and
detecting an object by using the first feature quantity and the second feature quantity.

9. A non-transitory computer-readable storage medium which stores a program to cause a computer to execute:
an extracting step of extracting, from an input image, a pattern of directional characteristic indicating a pattern in which a pixel value for a predetermined direction changes for each pixel;
a generating step of generating a first feature quantity based on at least one of a relation in which a directional characteristic extracted in the extracting step is rotated and a relation in which the directional characteristic is reversed with respect to an axis;
a converting step of converting the first feature quantity generated in the generating step into a second feature quantity, by rotating or reversing, with respect to the axis, the first feature quantity; and
a detecting step of detecting an object by using the first feature quantity and the second feature quantity.

10. An object detecting apparatus comprising:
an extracting unit configured to extract, from an input image, a pattern of directional characteristic indicating a changing pattern of pixel values in a predetermined direction;
an encoding unit configured to encode the extracted pattern of directional characteristic into a first feature quantity represented by a code of a predetermined length, where a pair of codes corresponding to a first pattern of directional characteristic and a second pattern of directional characteristic obtained by rotating or reversing the first pattern of directional characteristic have a predetermined relationship;
a converting unit configured to convert the first feature quantity encoded by the encoding unit into a second feature quantity, by performing operation on the first feature quantity based on the predetermined relationship; and
a detecting unit configured to detect an object from the input image by using the first feature quantity and the second feature quantity.

11. The object detecting apparatus according to claim 10, wherein the converting unit converts the first feature quantity corresponding to the first pattern of directional characteristic into the second feature quantity corresponding to the second pattern of directional characteristic obtained by rotating the first pattern of directional characteristic, by calculation using a value corresponding to a rotation angle of the rotating.

12. The object detecting apparatus according to claim 11, wherein the converting unit converts the first feature quantity into the second feature quantity by adding the value corresponding to the rotation angle to the first feature quantity.

13. The object detecting apparatus according to claim 10, wherein the converting unit converts the first feature quantity corresponding to the first pattern of directional characteristic into the second feature quantity corresponding to the second pattern of directional characteristic obtained by reversing the first pattern of directional characteristic, by performing a predetermined operation on the first feature quantity.

14. The object detecting apparatus according to claim 13, wherein the converting unit converts the first feature quantity into the second feature quantity by reversing a predetermined bit of a code representing the first feature quantity.

15. The object detecting apparatus according to claim 10, wherein
the converting unit further comprises
a histogram generating unit configured to generate a first histogram indicating a frequency that each value of the first feature quantity appears, and
a replacing unit configured to generate a second histogram indicating a frequency that each value of the second feature quantity appears, by replacing bins of the first histogram, and
the detecting unit detects the object from the input image by using the first histogram and the second histogram.

16. An object detecting method comprising:
extracting, from an input image, a pattern of directional characteristic indicating a changing pattern of pixel values in a predetermined direction;
encoding the extracted pattern of directional characteristic into a first feature quantity represented by a code of a predetermined length, where a pair of codes corresponding to a first pattern of directional characteristic and a second pattern of directional characteristic obtained by rotating or reversing the first pattern of directional characteristic have a predetermined relationship;
converting the encoded first feature quantity into a second feature quantity, by performing operation on the first feature quantity based on the predetermined relationship; and
detecting an object from the input image by using the first feature quantity and the second feature quantity.

17. A non-transitory computer-readable storage medium which stores a program to cause a computer to function as:
an extracting unit configured to extract, from an input image, a pattern of directional characteristic indicating a changing pattern of pixel values in a predetermined direction;
an encoding unit configured to encode the extracted pattern of directional characteristic into a first feature quantity represented by a code of a predetermined length, where a pair of codes corresponding to a first pattern of directional characteristic and a second pattern of directional characteristic obtained by rotating or reversing the first pattern of directional characteristic have a predetermined relationship;
a converting unit configured to convert the first feature quantity encoded by the encoding unit into a second feature quantity, by performing operation on the first feature quantity based on the predetermined relationship; and
a detecting unit configured to detect an object from the input image by using the first feature quantity and the second feature quantity.

* * * * *